(12) United States Patent  
Beylotte et al.

(10) Patent No.: US 9,187,955 B2  
(45) Date of Patent: *Nov. 17, 2015

(54) LOCKING CLUTCH FOR DOWNHOLE MOTOR

(71) Applicant: Smith International, Inc., Houston, TX (US)

(72) Inventors: James Edmond Beylotte, Crosby, TX (US); Lance D. Underwood, Morrison, CO (US)

(73) Assignee: Smith International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,672

(22) Filed: May 28, 2014

(65) Prior Publication Data

US 2014/0262677 A1 Sep. 18, 2014

Related U.S. Application Data

(63) Continuation of application No. 13/063,266, filed as application No. PCT/US2008/075850 on Sep. 10, 2008, now Pat. No. 8,776,915.

(51) Int. Cl.
| | |
|---|---|
| *E21B 4/00* | (2006.01) |
| *E21B 4/02* | (2006.01) |
| *F16D 43/16* | (2006.01) |
| *F16D 43/14* | (2006.01) |

(52) U.S. Cl.  
CPC . *E21B 4/006* (2013.01); *E21B 4/02* (2013.01); *F16D 43/16* (2013.01); *F16D 2043/145* (2013.01)

(58) Field of Classification Search  
None  
See application file for complete search history.

(56) References Cited

U.S. PATENT DOCUMENTS

| | | | |
|---|---|---|---|
| 2,167,019 | A | 7/1939 | Yost |
| 3,844,391 | A | 10/1974 | Hallerberg |
| 4,187,918 | A | 2/1980 | Clark |
| 4,232,751 | A | 11/1980 | Trzeciak |

(Continued)

FOREIGN PATENT DOCUMENTS

| | | |
|---|---|---|
| CA | 2256069 A1 | 6/2000 |
| CN | 1249015 A | 3/2000 |

(Continued)

OTHER PUBLICATIONS

Substantive Search and Examination Report issued in corresponding African Application No. AP/P/2011/005624; Dated Jul. 12, 2014 (3 pages).

(Continued)

*Primary Examiner* — Jennifer H Gay  
*Assistant Examiner* — Caroline Butcher  
(74) *Attorney, Agent, or Firm* — Osha Liang LLP

(57) ABSTRACT

A locking clutch to selectively transmit torque from a stator of a downhole tool to a rotor of the downhole tool includes at least one locking pawl disposed upon the rotor, wherein the at least one locking pawl comprises a load path, at least one pivot axis, and a mass center, wherein the at least one locking pawl is biased into an engaged position by a biasing mechanism, wherein the at least one locking pawl transmits force from the stator to the rotor along the load path when in the engaged position, and wherein centrifugal force urges the at least one locking pawl into a disengaged position when the rotor is rotated above a disengagement speed.

22 Claims, 7 Drawing Sheets

(56) References Cited

U.S. PATENT DOCUMENTS

| | | | |
|---|---|---|---|
| 4,253,532 | A | 3/1981 | Geczy |
| 4,276,944 | A | 7/1981 | Geczy |
| 4,299,296 | A | 11/1981 | Geczy |
| 4,632,193 | A | 12/1986 | Geczy |
| 5,168,941 | A | 12/1992 | Krueger et al. |
| 5,551,510 | A | 9/1996 | Mills |
| 5,875,859 | A | 3/1999 | Ikeda et al. |
| 6,092,610 | A | 7/2000 | Kosmala et al. |
| 6,129,190 | A | 10/2000 | Reed et al. |
| 7,100,756 | B2 | 9/2006 | Kimes et al. |
| 2005/0016604 | A1 | 1/2005 | Steinke et al. |
| 2005/0173155 | A1 | 8/2005 | Nevlud et al. |
| 2006/0021827 | A1 | 2/2006 | DiFranza et al. |
| 2006/0021837 | A1 | 2/2006 | Kimes et al. |
| 2006/0021841 | A1 | 2/2006 | Kimes et al. |
| 2008/0264692 | A1 | 10/2008 | Underwood et al. |

FOREIGN PATENT DOCUMENTS

| | | | |
|---|---|---|---|
| CN | 1831359 | A | 9/2006 |
| CN | 1854549 | A | 11/2006 |
| CN | 1940329 | A | 4/2007 |
| CN | 1940330 | A | 4/2007 |
| CN | 2931919 | Y | 8/2007 |
| CN | 101096982 | A | 1/2008 |
| EP | 0048897 | A2 | 4/1982 |
| GB | 2055927 | A | 3/1981 |
| SU | 401795 | A1 | 10/1973 |
| SU | 473792 | A1 | 6/1975 |
| SU | 737615 | A1 | 5/1980 |
| SU | 827743 | A1 | 5/1981 |
| SU | 1218195 | A1 | 3/1986 |

OTHER PUBLICATIONS

Office Action in counterpart Canadian Patent Application No. 2,737,298, mailed Aug. 14, 2014 (2 pages).
Examination Report issued in corresponding Australian Application No. 591640 dated Mar. 9, 2012 (1 page).
International Search Report from PCT/US2008/075850 dated Jun. 3, 2009 (2 pages).
Written Opinion from PCT/US2008/075850 dated Jun. 3, 2009 (4 pages).
Examination Report issued in corresponding Australian Application No. 291640 dated Mar. 9, 2012 (1 page).
Official Action issued in corresponding Russian Application No. 2011113769; Dated Jun. 5, 2012 (7 pages).
Examination Report issued in corresponding Australian Application No. 2008361682; Dated Jul. 10, 2012 (3 pages).
Official Action issued in corresponding Ukrainian Patent Application No. a 2011 02835 with an English language communication reporting the same; Dated Oct. 8, 2012 (6 pages).
Official Action issued in corresponding Colombian Application No. 11.032.053 with English language communication reporting the same; Dated Jan. 31, 2013 (11 pages).
Office Action issued in corresponding Chinese Application No. 200880131936.0; Dated Apr. 1, 2013 (18 pages).
Novelty Search Report and Examination Report issued in corresponding Application No. GCC/P/2008/11747 (8 pages).
Official Action issued in corresponding Kazakhstan Application No. 2011/1527.1 with English language communication reporting the same (6 pages).
Examination Report issued in corresponding Australian Application No. 2008361682; Dated Jul. 24, 2013 (3 pages).
Official Action issued in corresponding Mexican Application No. MX/a/2011/002629 and English Reporting thereof dated Aug. 6, 2013 (8 pages).
Office Action issued in corresponding Vietnamese Application No. 1-2011-00924 dated Sep. 27, 2013 (2 pages).
Examination Report issued in corresponding Gulf Cooperation Council Application No. 2008/11747 dated Nov. 12, 2013 (4 pages).
Office Action issued in corresponding Mexican Application No. MX/a/2011/002629 with English reporting thereof dated Jan. 22, 2014 (4 pages).
Search Report issued in European Application No. EP08821876; Dated May 26, 2015 (8 pages).
Search Report issued in European Application No. EP08155183; Dated May 26, 2015 (9 pages).

LOCKING CLUTCH FOR DOWNHOLE MOTOR

CROSS-REFERENCE TO RELATED APPLICATIONS

This application is a continuation of U.S. patent application Ser. No. 13/063,266, having a national stage entry date under 35 U.S.C. §371(c) of May 26, 2011, and which is a national stage entry of PCT International Application Serial No. PCT/US08/75850, filed Sep. 10, 2008, the entireties of which are incorporated herein by this reference.

BACKGROUND

Subterranean drilling operations are often performed to locate (exploration) or to retrieve (production) subterranean hydrocarbon deposits. Most of these operations include an offshore or land-based drilling rig to drive a plurality of interconnected drill pipes known as a drill string. Large motors at the surface of the drilling rig apply torque and rotation to the drill string, and the weight of the drill string components provides downward axial force. At the distal end of the drill string, a collection of drilling equipment known to one of ordinary skill in the art as a bottom hole assembly ("BHA") is mounted. Typically, the BHA may include drill bits, drill collars, stabilizers, reamers, mud motors, rotary steering tools, measurement-while-drilling sensors, and any other devices useful in subterranean drilling.

While most drilling operations begin vertically, boreholes do not always maintain that vertical trajectory along their entire depth. Frequently, changes in the subterranean formation may direct the borehole to deviate from vertical, as the drill string has a natural tendency to follow a path of least resistance. For example, if a pocket of softer, easier to drill, formation is encountered, the BHA and attached drill string may deflect and proceed into that softer formation more easily that a relatively harder formation. While relatively inflexible at short lengths, drill string and BHA components become somewhat flexible over longer lengths. As borehole trajectory deviation is typically reported as the amount of change in angle (i.e., the "build angle") per one hundred feet drilled, borehole deviation may be imperceptible to the naked eye. However, over distances of over several thousand feet, borehole deviation may be significant.

Furthermore, it should be understood that many borehole trajectories today desirably include planned borehole deviations. For example, in formations where the production zone includes a horizontal seam, drilling a single deviated bore horizontally through that seam may offer more effective production than several vertical bores. Furthermore, in some circumstances, it is preferable to drill a single vertical main bore and have several horizontal bores branch off therefrom to fully reach and develop all the hydrocarbon deposits of the formation. Therefore, considerable time and resources have been dedicated to develop and optimize directional drilling capabilities.

Typical directional drilling schemes include various mechanisms and apparatuses in the BHA to selectively divert the drill string from its original trajectory. One such scheme includes the use of a mud motor in combination with a bent housing device to the bottom hole assembly. In standard rotary drilling practice, the drill string is rotated from the surface to apply torque to the drill bit below. On the other hand, using a mud motor attached to the bottom hole assembly, torque may be applied to the drill bit therefrom, thereby eliminating the need to rotate the drill string from the surface.

While many varieties of mud motors exist, most may either be classified as turbine mud motors (i.e., turbodrills) or positive displacement mud motors. Regardless of design specifics, most mud motors function by converting the flow of high-pressure drilling mud into mechanical energy.

Drilling mud, as used in oilfield applications, is typically pumped to a drill bit downhole through a bore of the drill string at high pressure. Once at the bit, the drilling mud is communicated to the wellbore through a plurality of nozzles where the flow of the drilling mud cools, lubricates, and cleans drill cuttings away from cutting surfaces of the drill bit. Once expelled, the drilling mud is allowed to return to the surface through an annulus formed between the wellbore (i.e., the inner diameter of either the formation or a casing string) and the outer profile of the drill string. The drilling mud returns to the surface carrying drill cuttings with it.

When a mud motor is used, it is not necessary to rotate the drill string to rotate the drill bit with respect to the borehole. Instead, the drill string located above the mud motor is allowed to "slide" into the wellbore as the bit penetrates the formation. As mentioned above, a bent housing may be used in conjunction with a mud motor to directionally drill a wellbore. A bent housing may be similar to an ordinary section of the BHA, with the exception that a low angle bend is incorporated therein. Further, the bent housing may be a separate component attached above the mud motor (i.e., a bent sub), or may be a portion of the motor housing itself.

Through various measurement and telemetry devices in the BHA, a drilling operator at the surface is able to determine which direction the bend in the bent housing is oriented. The drilling operator may then rotate the drill string until the bend is in the direction of a desired deviated trajectory and the drill string rotation is stopped. The drilling operator then activates the mud motor and the deviated borehole is drilled, with the drill string advancing without rotation into the borehole (i.e., sliding) behind the BHA, using only the mud motor to drive the drill bit.

When the direction change is complete and a "straight" trajectory is again desired, the drilling operator rotates the entire drill string continuously to eliminate the directional effect the bent housing has on the drill string trajectory. When a change of trajectory is again desired, drill string rotation is stopped, the BHA is again oriented in the desired direction, and the mud motor drills in that trajectory while the remainder of the drill string slides into the wellbore.

One drawback of directional drilling with a mud motor and a bent housing arises when the drill string rotation is stopped and forward progress of the BHA continues with the mud motor. During these periods, the drill string slides further into the borehole as it is drilled and does not enjoy the benefit of rotation to prevent it from sticking in the formation. Particularly, such operations may carry an increased risk that the drill string will become stuck in the borehole and will require a costly fishing operation to retrieve the drill string and BHA.

More recently, in an effort to combat issues associated with drilling without rotation, rotary steerable systems ("RSS") have been developed. In a rotary steerable system, the BHA trajectory is deflected while the drill string continues to rotate. As such, rotary steerable systems are generally divided into two types, push-the-bit systems and point-the-bit systems. In a push-the-bit RSS, a group of expandable thrust pads extends laterally from the BHA to thrust and bias the drill string into a desired trajectory.

An example of one such system is described in U.S. Pat. No. 5,168,941. In order for this to occur while the drill string is rotated, the expandable thrusters extend from what is known as a geostationary portion of the drilling assembly.

Geostationary components do not rotate relative to the formation while the remainder of the drill string is rotated. While the geostationary portion remains in a substantially consistent orientation, the operator at the surface may direct the remainder of the BHA into a desired trajectory relative to the position of the geostationary portion with the expandable thrusters.

In contrast, a point-the-bit RSS includes an articulated orientation unit within the assembly to "point" the remainder of the BHA into a desired trajectory. Examples of such a system are described in U.S. Pat. Nos. 6,092,610 and 5,875,859. As with a push-the-bit RSS, the orientation unit of the point-the-bit system is either located on a geostationary collar or has a mechanical or electronic geostationary reference plane, so that the drilling operator knows which direction the BHA trajectory will follow. Instead of a group of laterally extendable thrusters, a point-the-bit RSS typically includes hydraulic or mechanical actuators to direct the articulated orientation unit into the desired trajectory.

As such, a mud motor may be used in conjunction with a RSS directional drilling system. Particularly, in certain circumstances, the bit may drill faster when the RSS and bit are driven by the mud motor, which results in a greater rotation speed than can be provided by the drill string alone. In such an arrangement, a drill string may be rotated at a relatively low speed to prevent drill string sticking in the wellbore while a mud motor output shaft (i.e., a rotor) positioned above an RSS assembly drives the drill bit at a higher speed.

As such, a positive displacement mud motor ("PDM") converts the energy of high-pressure drilling fluid into rotational mechanical energy at the drill bit using the Moineau principle, an early example of which is given in U.S. Pat. No. 4,187,918. A PDM typically uses a helical stator attached to a distal end of the drill string with a corresponding eccentric helical rotor engaged therein and connected through a driveshaft to the remainder of the BHA therebelow. As such, pressurized drilling fluids flowing through the bore of the drill string engage the stator and rotor, thus creating a resultant torque on the rotor which is then transmitted to the drill bit below. Historically, positive displacement mud motors have been characterized as having a low-speed, but high-torque output to the drill bit. As such, PDM's are generally best suited to be used with roller cone and polycrystalline diamond compact (PDC) bits. Further, because of the eccentric motion of their rotors, PDM's are known to produce large lateral vibrations which may damage other drill string components.

In contrast, turbine mud motors use one or more turbine power sections to provide rotational force to a drill bit. Each power section consists of a non-moving stator vanes, and a rotor assembly comprising rotating vanes mechanically linked to a rotor shaft. Preferably, the power sections are designed such that the vanes of the stator stages direct the flow of drilling mud into corresponding rotor blades to provide rotation. The rotor shaft, which may be a single piece, or may comprise two or more connected shafts such as a flexible shaft and an output shaft, ultimately connects to and drives the bit. Thus, the high-speed drilling mud flowing into the rotor vanes causes the rotor and the drill bit to rotate with respect to the stator housing. Historically, turbine mud motors have been characterized as having a high-speed, but low-torque output to the drill bit. Furthermore, because of the high speed, and because by design no component of the rotor moves in an eccentric path, the output of a turbine mud motor is typically smoother and considered appropriate for diamond cutter bits. Generally, the "stator" portion of the motor assembly is the portion of the motor body that is attached to, and rotates at the same speed, as the remainder of the drill string and the BHA.

However, because turbine mud motors are characterized by low torque output, drill bits attached thereto are more susceptible to becoming stuck when encountering certain formations. This occurs when the torque needed to rotate the bit becomes greater than the torque which the motor vanes are able to generate. In the event a drill bit becomes stuck during "rotary" drilling (i.e., drilling in which only drill string rotation is used to drive the bit), it is a common practice to apply a large torque at the surface through the entire drill string to free the drill bit. However in BHAs in which downhole motors are used, the rotation between the rotor and stator may prevent the transmission of torque from the drill string to the drill bit. As a result, the only torque that may be transmitted to a stuck drill bit to free the bit is the torque that the mud motor is able to produce. Because turbine mud motors generate relatively low torque, they may not be able to dislodge a stuck drill bit.

There have been several attempts to create means to lock the motor or turbine housing to the rotor shaft in the event that the bit becomes stuck, including those shown in U.S. Pat. Nos. 2,167,019, 4,232,751, 4,253,532, 4,276,944, 4,299,296, and 4,632,193. These devices generally required intervention from the surface, such as pulling or pushing on the drill string, or manipulating fluid flow rate, to engage a clutch device.

Other references disclose "one-way clutch" devices which have means to automatically lock the rotor to the stator when the body is rotating and the bit is stalled, and allow the rotor to rotate freely when the bit speed is greater than the stator speed. These devices, however, do not have provision to prevent the locking means from rubbing on the mating rotor or stator during normal operation (i.e., when the bit is not stuck, and the shaft is rotating at a faster speed than the motor body). As such, the locking means are likely to abrade rapidly and lose their function, unless they are in a sealed environment and thereby protected from abrasion by the drilling mud. However, at the relatively high speeds of turbines and some high-speed mud motors, seals are notoriously unreliable, so most downhole turbines and mud motors are constructed with non-sealed, mud-lubricated bearing assemblies.

What is still needed are downhole motors and methods for preventing a drill bit from becoming stuck and for freeing a stuck drill bit. It is desirable to be able to apply torque from the drill string to the stator of a downhole motor and then from the stator of the motor to a rotor, without requiring manipulation of the drill string or the flow rate. Further, it is beneficial to provide means to engage the motor stator to the motor rotor when the bit is stuck and the stator is free to rotate, and to disengage those means when the rotor is rotating at some rotational speed which is greater than the rotational speed of the stator.

SUMMARY

In one aspect, the present disclosure relates to a locking clutch to selectively transmit torque from a stator of a downhole tool to a rotor of the downhole tool. The locking clutch includes at least one locking pawl disposed upon the rotor, wherein the at least one locking pawl comprises a load path, a pivot axis, and a mass center. Furthermore, the at least one locking pawl is biased into an engaged position by a biasing mechanism and the at least one locking pawl transmits force from the stator to the rotor along the load path when in the engaged position. Furthermore centrifugal force urges the at least one locking pawl into a disengaged position when the rotor is rotated above a disengagement speed.

In another aspect, the present disclosure relates to a method to selectively transmit torque from a stator of a downhole drilling motor to a rotor of the downhole drilling motor. The method includes locating a clutch between the stator and the rotor, wherein the clutch comprises at least one locking pawl rotatable about a pivot axis between an engaged position and a disengaged position and rotating the at least one locking pawl from the engaged position to the disengaged position through centrifugal force when the speed of the rotor exceeds a disengagement speed. Furthermore, the method includes rotating the at least one locking pawl from the disengaged position to the engaged position when the speed of the rotor falls below the disengagement speed and transmitting torque from the stator to the rotor of the downhole drilling motor through a load path of the at least one locking pawl when in the engaged position.

Other aspects and advantages of the disclosure will be apparent from the following description and the appended claims.

DETAILED DESCRIPTION

In one aspect, embodiments disclosed herein relate to rotary downhole tools. More particularly, embodiments disclosed herein relate downhole motor assemblies to drive drill bits. More particularly still, embodiments disclosed herein relate to a locking clutch for selectively engaging a rotor with a stator of a downhole tool to drive a drill bit.

Figure 1A:
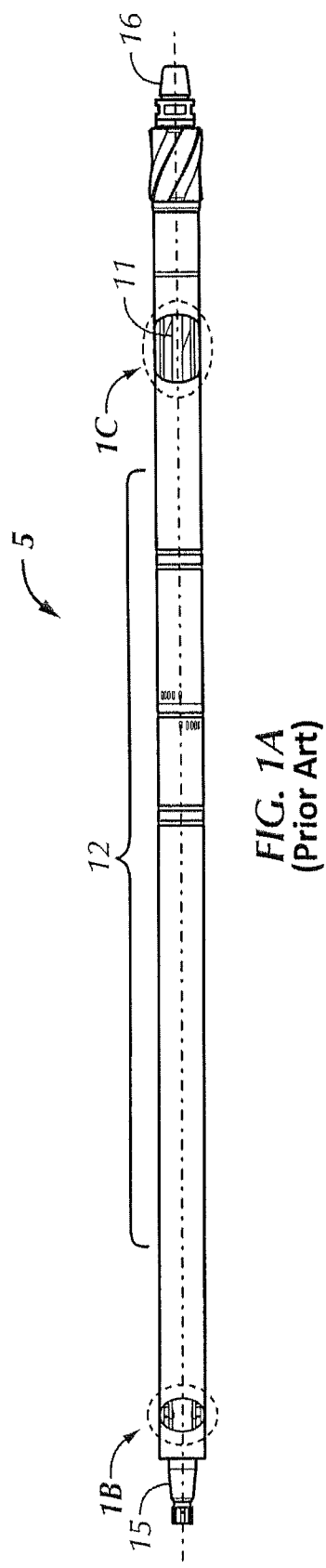
FIGS. 1A-1C show a downhole tool in accordance with embodiments disclosed herein.
Figure 1B:
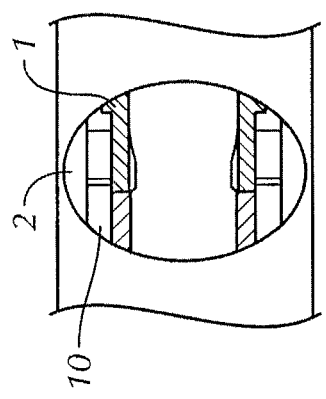
Figure 1C:
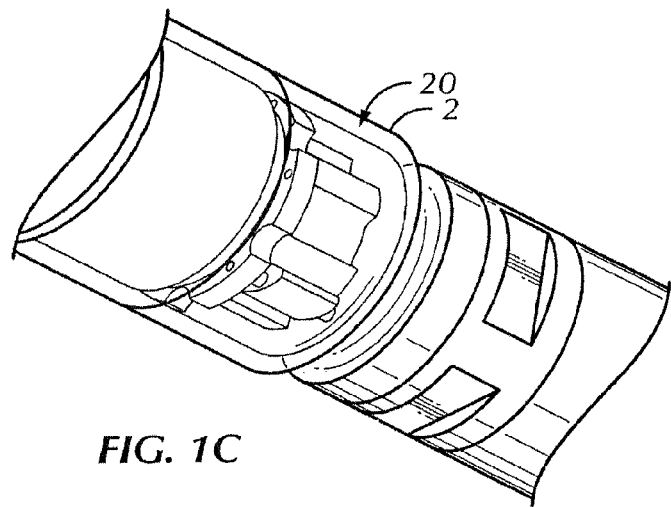

Referring initially to FIGS. 1A-C, a downhole turbine mud motor bearing 5 in accordance with one embodiment of the present disclosure is shown. Particularly, as shown in FIG. 1A, the downhole motor bearing assembly 5 is driven by a turbodrill; however, those of ordinary skill in the art will appreciate that locking mechanisms in accordance with embodiment of the present disclosure may also be attached to positive displacement mud motors or electric motors, the housing (i.e., the stator) of which typically have the same characteristic in that it is rotationally disconnected from a rotor. FIG. 1A is representative of a turbine bearing assembly in that it has an upper connection 15 that is connected to a turbine power section and a lower connection 16 that is connectable to a drill bit (not shown). A housing 2 may contain several working components of turbine 5 (e.g., journal bearings, thrust bearings, etc.), which those of ordinary skill in the art will be able to design without further disclosure. Preferably, upper connection 15 is rotationally fixed relative to housing 2, while lower connection 16 is rotationally fixed relative to a rotor 1 (visible in FIGS. 1B and 1C).

Turbine mud motor 5 is operated by pumping drilling fluid through the drill string into an annular space 10. The flow of the drilling fluid is directed through a plurality of turbine vanes (located in a turbine power section portion, not shown, above upper connection 15) to provide rotational force upon rotor 1. After being used by the turbine vanes, the drilling fluid exits turbine mud motor 5 through a second annular space 11, which continues through lower connection 16. Those having ordinary skill in the art will be able to design suitable motor portions for providing rotational force. In order to selectively transmit torque from housing 2 to rotor 1, embodiments disclosed herein use a locking mechanism to selectively provide a rotational link between housing 2 and rotor 1. In one or more embodiments, the locking mechanism may be a locking clutch, which may be referred to as a one-way clutch.

As described above, transmitting torque from housing 2 to rotor 1 may be desired when a downhole motor stalls during drilling or when a drill bit becomes stuck. FIG. 1C shows a detailed view of a locking mechanism in accordance with embodiments disclosed herein. In this embodiment, the locking mechanism is disposed at the lower end of rotor 1 (position on the turbine mud motor 5 is shown in FIG. 1A). One advantage of locating a locking mechanism on the lower end of rotor 1 is that rotor 1 may be strongest at its lower end. The relative size of the upper end of the rotor 1 is shown in FIG. 1B.

In some embodiments, the lower end of rotor 1 may be able to withstand three to four times the amount of torque than the upper end. Disposing a locking mechanism at the lower end also prevents large amounts torque from being transmitted through other, weaker portions of rotor 1. However, one of ordinary skill in the art will appreciate that a locking mechanism may also be disposed at other locations (including the upper end) of a downhole motor without departing from the scope of embodiments disclosed herein.

Referring now to FIG. 1C a locking clutch 20 that may be used in accordance with one embodiment of the present disclosure is shown. Locking clutch 20 is designed to engage based on relative rotation between rotor 1 and housing 2. When the downhole motor is operating correctly during drilling, rotor 1 will be turning at a higher speed (e.g., 1000 revolutions per minute) than housing 2, which may be turning at a substantially constant, low speed (e.g., 40 revolutions per minute). Should the drill bit rotation become restricted, rotor 1 slows or ceases to turn, but the housing, driven at drill string speed, will continue to turn the rotor.

To prevent stalling of the drill bit and motor, locking clutch 20 may be configured to engage and apply torque from housing (i.e., a stator) 2 to rotor 1 when the rotational speed of rotor 1 no longer exceeds that of the rotational speed of the housing (i.e., when the relative rotation between housing 2 and rotor 1 is zero). When this occurs, the locking clutch will mechanically engage, or couple, the rotating housing with the rotor, and in doing so, impart rotation to the bit and free it from being stuck. Following engagement, if the drill bit is freed and rotation of rotor 1 is able to resume as driven by the turbine vanes, locking clutch 20 will first mechanically, then centrifugally disengage rotor 2 from housing 1 and thus allow normal operation of the motor to continue. Because locking clutch 20 is able to ratchet and disengage on its own once rotor 1 exceeds the speed of the drill string and housing, there is no need to trip out the drill string to repair or reset the motor assembly.

Furthermore, because the clutch will be ratcheting relative the housing any time the speed of the rotor exceeds that of the housing, at relatively low rotor speeds, the clutch engagement means will rub on the housing, inviting wear due to the abrasive nature of drilling mud. To prevent excessive wear, the clutch is designed to maintain constant disengagement once a given rotation speed threshold is reached. A more detailed description of locking clutch 20 follows below.

Figure 2A:
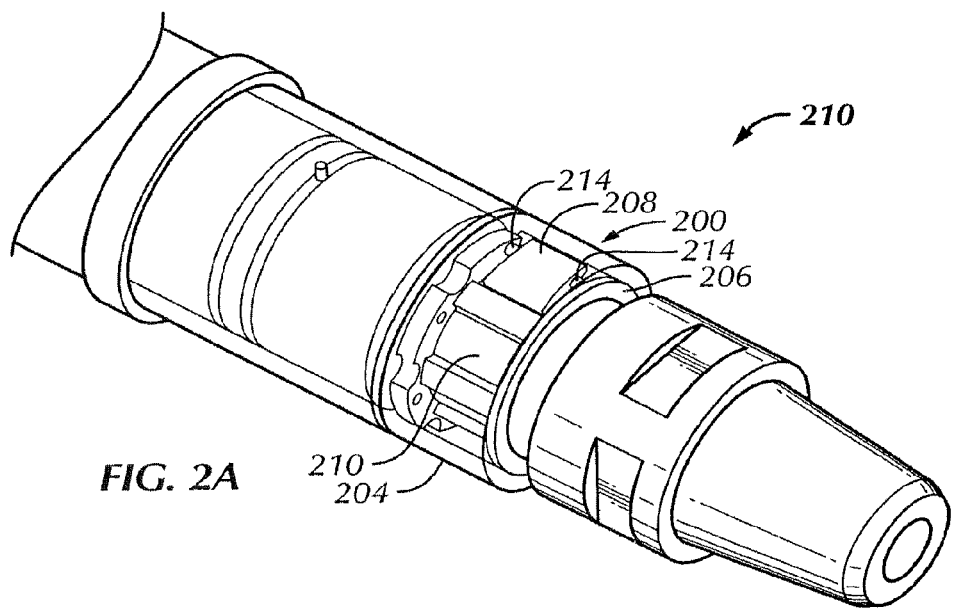
FIGS. 2A and 2B show a locking clutch in accordance with embodiments disclosed herein.
Figure 2B:
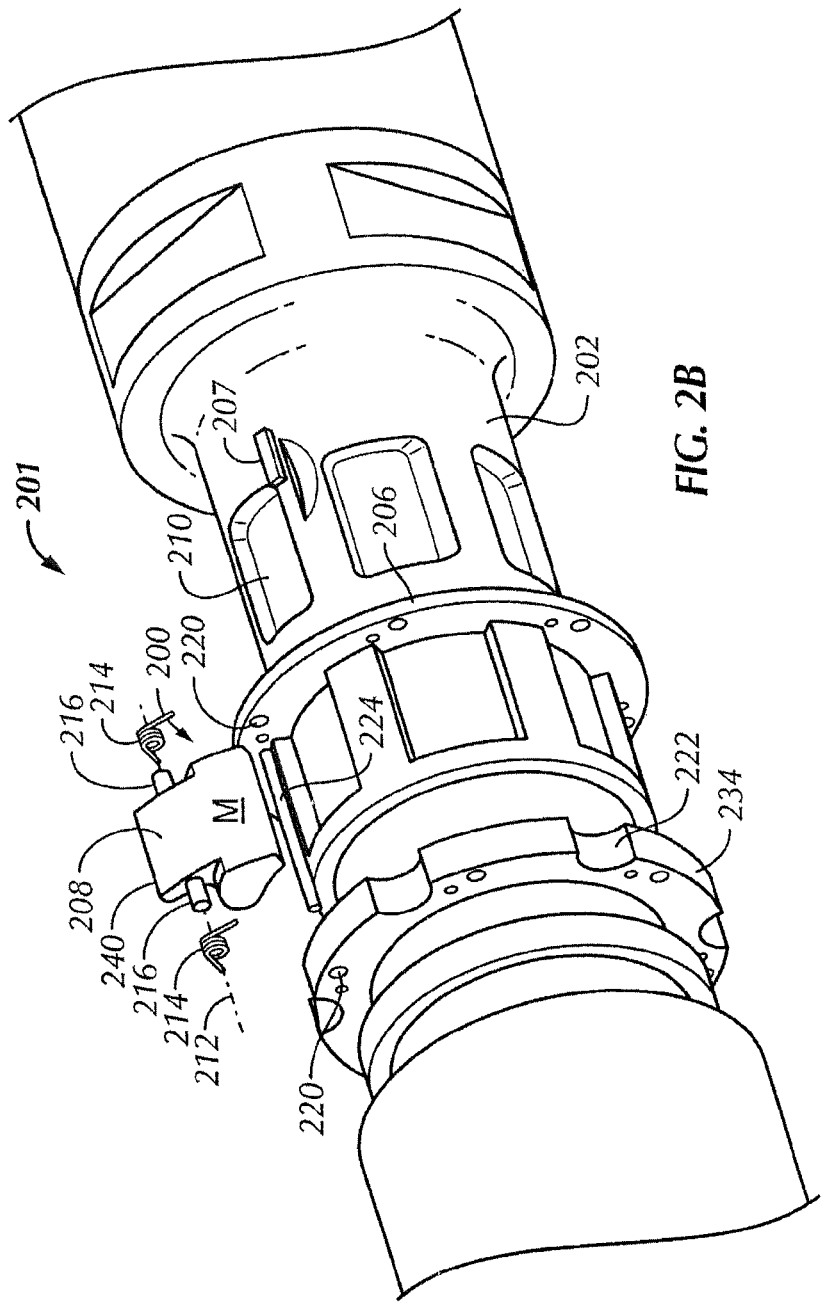

Referring now to FIGS. 2A and 2B (where FIG. 2B is an exploded view of FIG. 2A), a locking clutch 200 is shown in accordance with embodiments of the present disclosure. Locking clutch 200 is configured to selectively engage a rotor 202 with a stator 204 (e.g., housing 2 of FIG. 1) of a rotary downhole tool 201. One of ordinary skill in the art will appreciate that the downhole tool 201 may be any rotary tool known in the art including, but not limited to, an electric motor, a turbine mud motor (i.e., a turbodrill), or a positive displacement mud motor. In the embodiment shown, locking clutch 200 includes a carrier assembly 206 mounted upon rotor 202. While carrier assembly 206 is shown formed from a single cylindrical piece that may be engaged upon rotor 206, it should be understood that it may, in the alternative, be formed from multiple pieces coupled around rotor 206. Furthermore, one or more keys 207 may be inserted between carrier assembly 206 and rotor 202 to rotationally lock carrier assembly 206 in place upon rotor 202. Alternatively still, a separate carrier assembly may not be required at all, with the rotor containing all the structure necessary to retain locking pawls 208.

Further, carrier assembly 206 includes one or more locking pawls 208 circumferentially disposed about carrier assembly 206. As such, pawls 208 are preferably configured to engage a plurality of recesses 210 formed in the outer periphery of rotor 202. Pawls 208 may be coupled to carrier assembly 206 by any method known in the art such that each pawl 208 may rotate about a pivot axis 212. For example, cylindrical side pins 216 may be inserted and locked in corresponding openings 220 formed in carrier assembly 206. Biasing members 214 may be disposed between side pins 216 of each pawl 208 and carrier assembly 206, thereby biasing pawls 208 inward towards recesses 210 in an "engaged" position, such that pawls 208 are engaged with corresponding recesses 210 formed in rotor 202. Furthermore, as shown, a carrier end plate 234 is engaged behind pawl carrier 206 and pawls 208 to lock pawls 208 into pawl carrier assembly 206. As such, carrier end plate 234 includes corresponding openings 220 to receive cylindrical side pins 216 of pawls 208. Additionally, a stop pin 224 extends between carrier end plate 234 and pawl carrier 206 to prevent pawls 208 from rotating too far about pivot axis 212.

Figure 5:
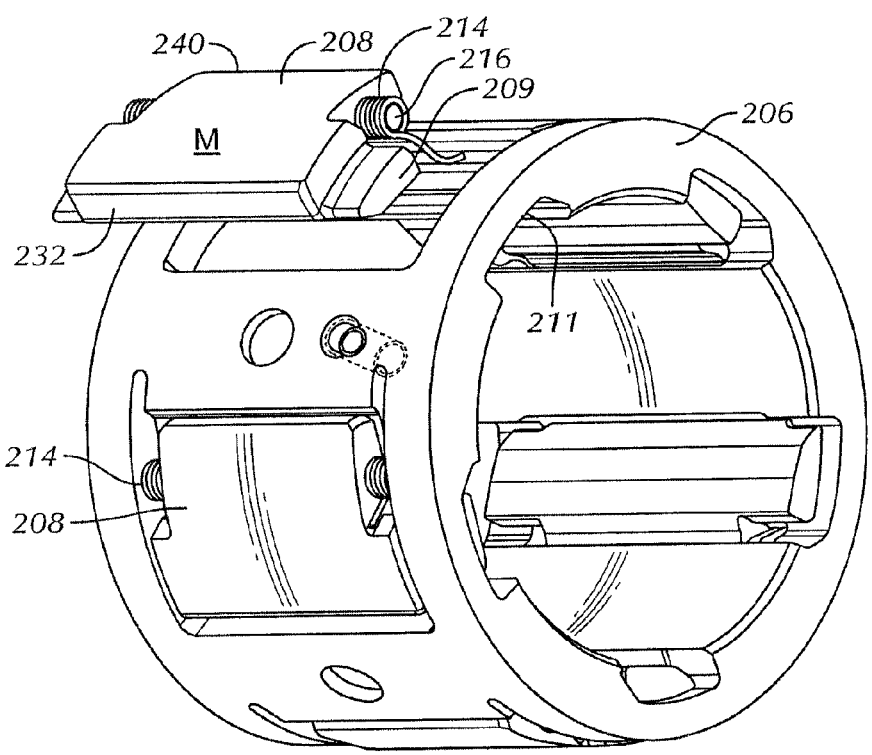
FIG. 5 is a perspective view of a locking clutch in accordance with embodiments disclosed herein.

In an alternate embodiment, cylindrical side pins 216 may not be inserted in openings 220. Rather, pawls 208 are inserted in carrier assembly 206, such that cylindrical side pins 216 are disposed proximate an inner surface of the carrier assembly 206. As shown in FIG. 5, in this embodiment, pawls 208 include at least one extension portion 209 disposed on at least one side of pawl 208. Extension portion 209 is configured to engage with a corresponding undercut 211 formed on an inside diameter of the carrier assembly 206. Thus, in this embodiment, pawls 208 may move about at least two pivot axes (A and B in FIG. 6B) within carrier assembly 206, described in greater detail below. Engagement of extension portion 209 with corresponding undercut 211 limits the rotation of pawl 208 within carrier assembly 206, thereby preventing over rotation of the pawl 208.

In one embodiment, biasing members 214 may be, for example, torsion springs disposed around side pins 216. In an alternative embodiment, cutouts 222 in carrier end plate 234 may be formed to direct the flow of drilling fluids (i.e., drilling mud) across pawls 208 such that the fluid flow assists in biasing pawls 208 inward toward the engaged position. Similarly, the back sides of pawls 208 may be configured to divert the longitudinal flow of drilling mud thereacross to create radial force.

In one embodiment, biasing members 214 may be selected such that locking pawls 208 are biased towards the engaged positioned with a predetermined torque provided by biasing member 214. As rotor 202 rotates at relatively low speed, the spring force of biasing members 214 urges a leading end 232 of locking pawls 208 into corresponding recesses 210 on rotor 202 and urges trailing ends 240 alternately into contact with locking notches 242 on housing 204, and with housing inner diameter 218. As the trailing ends 240 of the pawls 208 rotate past the locking notches 242, the locking notches 242 act as cam surfaces to mechanically drive the pawls 208 out of the locking notches 242. At low speeds, then, the pawls 208 simply function as a conventional ratchet mechanism in that the pawls 208 alternate between the engaged and disengaged positions. Each pawl 208 has a mass center, generally indicated at M. As shown, mass center M is offset by distance D with respect to pivot axis 212. Rotation of rotor 202 creates centrifugal force that acts on mass center M. Since mass center M is offset from pivot axis 212 (FIG. 2B) or pivot axis B (FIG. 6B), said centrifugal force results in a torque being applied to locking pawls 208, said torque being in the opposite direction of the torque applied by bias member 214. Therefore, as the speed of rotation of the rotor 202 increases, the centrifugal force acting on each pawl 208 at mass center M increases, and the resulting torque increases correspondingly. When the torque resulting from the centrifugal force acting on each pawl 208 overcomes the torque created by spring force of the biasing members 214, the pawls 208 are no longer urged into contact with locking notches 242 and housing inner diameter 218, thereby maintaining disengagement of the locking clutch 200 through centrifugal action as opposed to through mechanical, ratcheting action. The centrifugal force may be defined by:

$$F_{centrifugal} = M \cdot r \cdot \omega^2 \quad (1)$$

Where M is the mass of the pawl, r is the distance from the mass center of the pawl to the center of a turbine shaft, and ω is the rotational velocity of the turbine shaft. Stop pin 224 prevents pawls 208 from centrifugally rotating too far out of disengagement with recesses 210. The torque resulting from centrifugal force may be defined by:

$$T_{centrifugal} = F_{centrifugal} \cdot D \quad (2)$$

Figure 3:
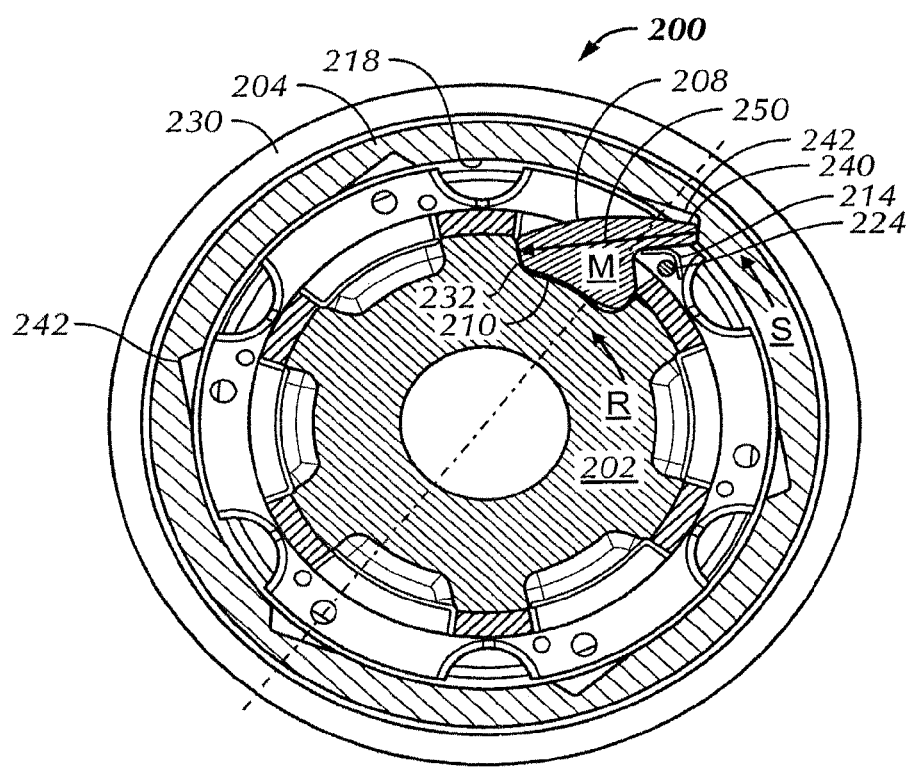
FIG. 3 is a cross-sectional view of a locking clutch in an engaged position in accordance with embodiments disclosed herein.
Figure 4:
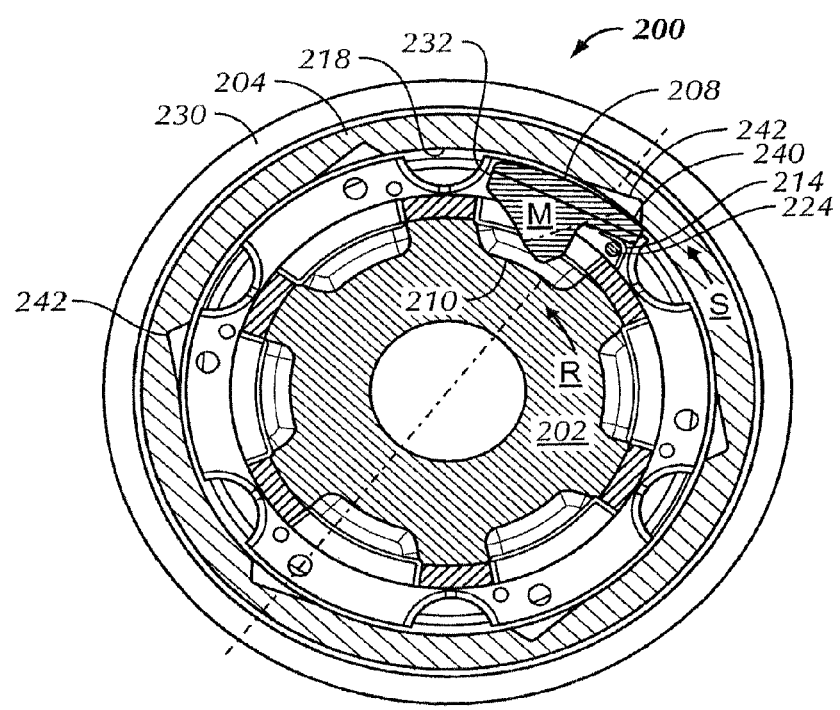
FIG. 4 is a cross-sectional view of a locking clutch in a disengaged position in accordance with embodiments disclosed herein.

Referring now to FIGS. 3 and 4, a cross-sectional view of locking clutch 200 (viewed from the bottom) is shown in an engaged and disengaged position, respectively. During drilling operations, stator 204 rotates as driven by drill string rotation as indicated by arrow S and rotor 202 rotates as indicated by arrow R. As shown, rotation R and rotation S are in the same direction. Under normal conditions, rotation S is significantly lower in angular velocity compared to rotation R. Typically, during drilling, rotor 202 rotates at a much higher speed (e.g., 400-2000 RPM) with lower torque, while stator 204 and corresponding housing 230 rotate at the lower speed (e.g., about 10-100 RPM) and higher torque of the remainder of the drill string.

Figure 2C:
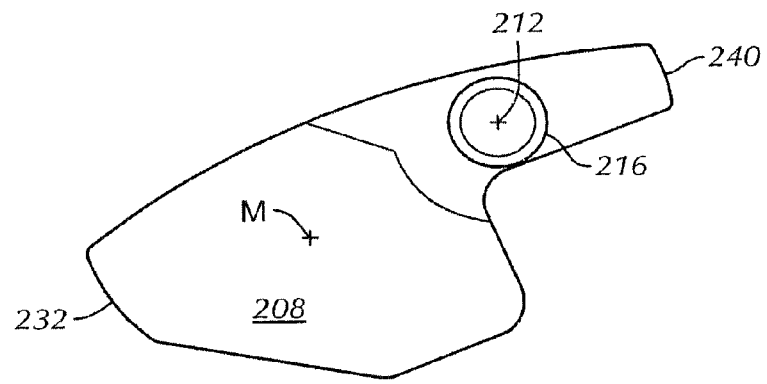
FIG. 2C shows a pawl of the locking clutch of FIGS. 2A and 2B in accordance with embodiments disclosed herein.

As discussed above with reference to FIGS. 2A-2C, biasing members 214 disposed on locking pawls 208 bias the locking pawls 208 toward the engaged position in corresponding recesses 242 formed in stator 204. As the rotational speed of rotor 202 increases in direction R, centrifugal force acting on the mass center M about pivot axis 212 of locking pawls 208 increases in accordance with Equation 1 shown above. Once the speed of rotor 202 reaches the disengagement speed, centrifugal force acting on mass center M of locking pawls 208 is greater than the spring force of biasing members 214 urging locking pawls 208 toward the engaged position. At speeds greater than and including the disengagement speed, locking pawls 208 rotate outward about pivot axis 212 and the trailing edges 240 lift off the housing inner diameter 218.

Figure 6A:
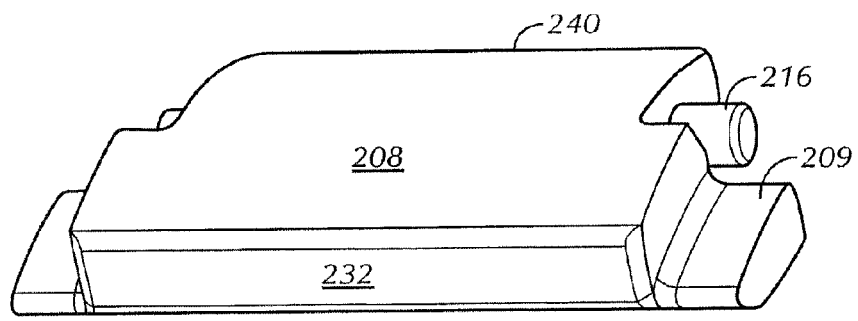
FIGS. 6A and 6B show a pawl of the locking clutch of FIG. 5 in accordance with embodiments disclosed herein.
Figure 6B:
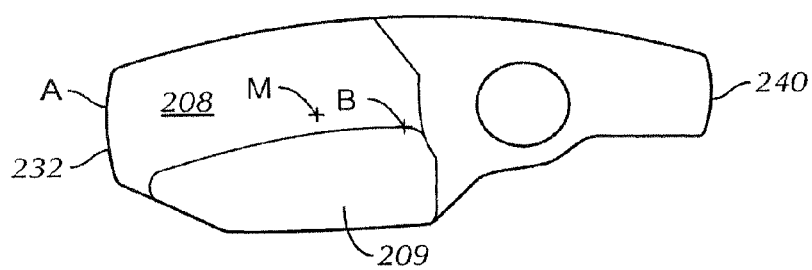

With reference to the embodiment shown in FIGS. 5, 6A, and 6B, biasing members 214 disposed on locking pawls 208 bias the locking pawls 208 toward the engaged position in corresponding recesses 242 formed in stator 204 (FIG. 3). As the rotation speed of rotor 202 increases in direction R, centrifugal force acting on mass center M increases in accordance with Equation 1 shown above. In this embodiment, however, the pawl 208 pivots about various pivot axes. Thus, the pivot axis may be referred to herein as a dynamic pivot axis. Referring now to FIG. 6B, a side view of pawl 208 is shown in accordance with embodiments disclosed herein. At low speeds, pawl 208 rotates about pivot axis A. In this embodiment, pivot axis A corresponds to a line of contact between leading edge 232 of pawl 208 and rotor 202.

Once the speed of rotor 202 reaches the disengagement speed, centrifugal force acting on mass center M of locking pawls 208 exceeds the spring force of biasing members 214. Locking pawls 208 move radially outward until extension portions 209 contact undercuts 211 in carrier assembly 206. Once the extension portions 209 contact undercuts 211, the pawl 208 rotates about the line of contact, identified as pivot axis B, between extension portion 209 and undercut 211. Thus, at speeds greater than and including the disengagement speed, locking pawls 208 rotate outward about pivot axis B and the trailing edges 240 lift off the housing inner diameter 218. Thus, in this embodiment, a pivot axis of pawl 208 may move or change, thereby allowing more movement of pawl 208 within carrier assembly 206 and preventing engagement loads from being transmitted to carrier assembly 206. Further, one of ordinary skill in the art will appreciate that there may be 1, 2 or more pivot axes about which pawl 208 moves depending on the geometries of pawl 208, carrier assembly 206, and extension portions 209.

It should be noted that the disengagement speed includes both the rotation of stator 204 and rotor 202 together. Because stator 204 rotates in direction S and rotor 202 rotates in direction R, and rotor 202 is driven by stator 204, the total rotation speed (i.e., R+S) will affect the centrifugal force acting upon mass center M of pawl. Rotor speed R shall be defined as the rotor speed relative to that of the stator. Therefore, if the drill string is rotated at 100 RPM and the disengagement speed of locking clutch 200 is 400 RPM, locking clutch will mechanically ratchet when the rotor speed R is between zero and 300 RPM, and will maintain disengagement when rotor speed R exceeds 300 RPM. As such, one of ordinary skill in the art will appreciate that the biasing members 214 may be selected so that locking pawls 208 maintain disengagement at a particular disengagement speed of rotor 202. For example, in one embodiment, locking pawls 208 may maintain disengagement from corresponding recesses 210 at a total rotor speed of approximately 300 to 400 RPM. Furthermore, one of ordinary skill will also recognize that the geometry and material properties (e.g., the density) of locking pawls 208 may be varied to achieve a particular disengagement speed. Particularly, the magnitude and location of mass center M with respect to pivot axis 212 may be varied to achieve a particular disengagement speed. Given certain size constraints, it may be advantageous to manufacture the locking pawls 208 from a high-density material such as tungsten carbide to increase their mass.

Still referring to FIGS. 3 and 4, engagement of locking clutch 200 will now be discussed. In the event the drill bit (not shown) becomes stuck or slows in rotational speed, locking clutch 200 engages and transmits torque from stator 204 to rotor 202 to drive the bit through the formation in the following manner. As the velocity of rotor 202 slows, the centrifugal force acting on the locking pawls 208 decreases. When total rotational speed of the rotor 202 slows to less than disengagement speed, the torque resulting from centrifugal force is less than the torque from the bias members 214, and locking pawls 208 rotate around their respective pivot axes (212, FIG. 2B, or A, B, FIG. 6B) due to the spring force of biasing members 214, thereby urging trailing end 240 of locking pawls 208 into contact with inner diameter 218 of stator 204 and into locking notches 242.

As rotor 202 continues to slow and the leading edges 232 of locking pawls 208 move into corresponding recesses 210, trailing end 240 of locking pawl 208 extends radially outward into contact with inner diameter 218 of stator 204 and locking notches 242. Once extended, as long as the rotational speed R of rotor 202 exceeds the rotational speed S of stator 204, trailing ends 240 of locking pawls 208 will "ratchet" through a plurality of locking notches 242 formed on the inner diameter of stator 204. As long as the total rotor speed is below the disengagement speed, the locking pawls 208 will engage when rotor speed R (as defined previously, relative to stator speed S) is zero. The condition where rotor speed R, so defined, is zero is termed "engagement speed."

Locking notches 242 are preferably constructed such that trailing ends 240 of pawls 208 do not interfere with rotation of rotor 202 when it is rotating faster than stator 204. However, when the rotor 202 slows to engagement speed, locking pawls 208 engage corresponding recesses 210 of rotor 202 as locking notches 242 of stator 204 engage trailing ends 240 of locking pawls 208. Once engaged, rotational force (i.e., torque) is transferred from stator 204 to rotor 202 along a load path 250 extending through pawls 208. Preferably, pawls 208 are designed such that load path 250 extends substantially straight through locking pawl 208 with no bending or shear loads. Accordingly, stator 204 provides sufficient torque to drive rotor 202 and, thus, the drill bit (not shown) to drill through the formation. Once the difficult formation is drilled (or the weight on bit reduced), the motor driving the bit is free to speed up again, thus mechanically disengaging locking clutch 200 and entering the ratcheting mode automatically once rotor speed R exceeds stator speed S.

Advantageously, drilling with embodiments of the present disclosure helps prevent drill bits from becoming stuck when used in conjunction with downhole motors. Furthermore, if a bit becomes stuck, embodiments of the present disclosure may be used to free the drill bit. Typically, while drilling using a downhole motor, the drill string is rotated at a low speed while the shaft of a downhole motor turning the drill bit is rotated a higher speed. Under normal conditions, a locking mechanism in accordance with embodiments of the present disclosure would remain disengaged. However, in a situation where a downhole motor stalls or slows below a determined speed, the locking mechanism may engage so that the slowly rotating drill string may apply torque to the stalling drill bit. For example, if the drill string is rotated by a surface rotary tool at 100 RPM while the downhole motor rotates at 200 RPM, a locking clutch in accordance with embodiments disclosed herein would engage when the downhole motor stalls to a rotational speed equal to 100 RPM. At that point, torque from the surface rotary tool would be transmitted to the shaft to maintain rotation of the bit relative to the formation. Once the bit breaks through the troublesome formation, the downhole motor may then recover and return to the higher rotational speed, which would automatically disengage the locking clutch, initially disengaging by ratcheting mechanically, then completely maintaining disengagement by centrifugal force.

While the present disclosure has been described with respect to a limited number of embodiments, those skilled in the art, having benefit of this disclosure, will appreciate that other embodiments may be devised which do not depart from the scope of the present disclosure. Accordingly, the scope of the present disclosure should be limited only by the attached claims.

What is claimed is:

1. A locking clutch for a downhole motor, comprising:
   a carrier configured to selectively couple a rotor and a stator; and
   at least one locking pawl circumferentially disposed about the carrier, the at least one locking pawl being configured to change between:
   an engaged position in which the at least one locking pawl transmits force from the stator to the rotor and rotates about a first pivot axis; and
   a disengaged position in which the rotor is rotatable independent of the stator and rotates about a second pivot axis.

2. The locking clutch of claim 1, further comprising:
   at least one biasing mechanism configured to bias the at least one locking pawl into the engaged position.

3. The locking clutch of claim 1, the at least one locking pawl being configured to be in the disengaged position when the rotor is rotated at or above a disengagement speed.

4. The locking clutch of claim 1, the first pivot axis being located at a line of contact between a leading edge of the at least one locking pawl and the rotor.

5. The locking clutch of claim 4, the leading edge of the at least one locking pawl being located in a recess of the rotor when the at least one locking pawl is in the engaged position.

6. The locking clutch of claim 1, the at least one locking pawl including a trailing edge configured to engage the stator when the at least one locking pawl is in the engaged position.

7. The locking clutch of claim 1, the second pivot axis being located at a line of contact between an extension portion of the at least one locking pawl and the carrier.

8. The locking clutch of claim 7, the line of contact being located between the extension portion and an undercut of the carrier.

9. The locking clutch of claim 8, wherein the undercut is configured to engage with the extension portion to restrict over-rotation of the at least one locking pawl.

10. The locking clutch of claim 1, the at least one locking pawl being configured to be in the engaged position when a total rotational speed of the rotor is less than the disengagement speed.

11. The locking clutch of claim 10, the at least one locking pawl being configured to be in the engaged position when a rotational speed of the stator is at least as large as the total rotational speed of the rotor.

12. The locking clutch of claim 1, the at least one locking pawl being configured to act as a ratchet when a total rotational speed of the rotor is greater than a rotational speed of the stator and less than a disengagement speed.

13. The locking clutch of claim 1, the at least one locking pawl being configured to be in the engaged position when the rotor is rotated at an engagement speed.

14. The locking clutch of in claim 13, the engagement speed of the rotor occurring when the rotor has no rotation relative to the stator.

15. The method of claim 14, wherein rotating the at least one locking pawl about the first pivot axis includes using centrifugal force of the at least one pawl about a center of mass to overcome a biasing force.

16. The method of claim 15, the locking clutch including a carrier and at least one biasing member positioned between the at least one locking pawl and an end plate of the carrier.

17. A method for transmitting torque in a downhole tool, comprising:
   locating a locking clutch between a stator and the rotor, the locking clutch including at least one locking pawl with a dynamic pivot axis, a position of the pivot axis being different when the locking clutch is in a disengaged position as compared to an engaged position;
   rotating the at least one locking pawl about a first pivot axis when the at least one locking pawl is in the disengaged position and the rotor rotates above a disengagement speed;
   transmitting torque along a load path that excludes the at least one locking pawl when the at least one locking pawl is in the disengaged position;
   rotating the at least one locking pawl about a second pivot axis when the at least one locking pawl is in the engaged position and the rotor rotates below the disengagement speed; and
   transmitting torque along a load path that includes the at least one locking pawl when the at least one locking pawl is in the engaged position.

18. The method of claim 17, further comprising at least one of:
   biasing a leading edge of the at least one locking pawl into a recess of the rotor; or
   biasing a trailing edge of the at least one locking pawl into engagement with the stator.

19. The method of claim 18, wherein biasing the trailing edge of the at least one locking pawl into engagement with the stator includes biasing the trailing edge into a locking notch acting as a cam surface for mechanically driving the at least one locking pawl out of the locking notch.

20. A locking clutch for a downhole tool, comprising:
   a carrier configured to be coupled to a shaft of a turbine motor and to a rotary component;
   at least one locking pawl coupled to the carrier, the at least one locking pawl being configured to change between:
   an engaged position in which the at least one locking pawl transmits force from the rotary component to the shaft and rotates about a first pivot axis; and
   a disengaged position in which shaft is rotatable independent of the rotary component and rotates about a second pivot axis.

21. The locking clutch recited in claim 20, the rotary component including a turbine housing.

22. The locking clutch recited in claim 20, the carrier being positioned at:
   a lower end portion of the turbine motor; or
   an upper end portion of the turbine motor.

* * * * *